(12) United States Patent
Gault et al.

(10) Patent No.: US 10,445,533 B2
(45) Date of Patent: Oct. 15, 2019

(54) METHOD OF OPTIMIZING MEMORY WIRE ACTUATOR ENERGY OUTPUT

(71) Applicant: Microsoft Technology Licensing, LLC, Redmond, WA (US)

(72) Inventors: Joseph Benjamin Gault, Seattle, WA (US); Scott Douglas Bowers, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 15/638,604

(22) Filed: Jun. 30, 2017

(65) Prior Publication Data

US 2019/0005272 A1 Jan. 3, 2019

(51) Int. Cl.
| | | |
|---|---|---|
| *E05B 65/00* | (2006.01) | |
| *F03G 7/06* | (2006.01) | |
| *G06F 21/85* | (2013.01) | |
| *E05B 73/00* | (2006.01) | |
| *H01R 13/639* | (2006.01) | |

(Continued)

(52) U.S. Cl.
CPC ............ *G06F 21/85* (2013.01); *E05B 51/005* (2013.01); *E05B 65/0067* (2013.01); *E05B 73/0052* (2013.01); *E05B 73/0082* (2013.01); *F03G 7/06* (2013.01); *G06F 1/1616* (2013.01); *G06F 1/1632* (2013.01); *G06F 1/1654* (2013.01); *G06F 1/1669* (2013.01);
(Continued)

(58) Field of Classification Search
CPC ...... G06F 21/85; G06F 1/1679; G06F 1/1669; G06F 1/1654; G06F 1/1632; G06F 1/1616; F03G 7/06; E05B 73/0052; E05B 65/0067; E05B 51/005; E05B 73/0082; H04M 1/0249; H04M 1/0254; H01R 13/6397
See application file for complete search history.

(56) References Cited

U.S. PATENT DOCUMENTS

| | | |
|---|---|---|
| 3,940,935 A | 3/1976 | Richardson et al. |
| 4,131,378 A | 12/1978 | Daws |

(Continued)

FOREIGN PATENT DOCUMENTS

| | | |
|---|---|---|
| EP | 3116205 A1 | 1/2017 |
| WO | WO2017/062219 | 4/2017 |

OTHER PUBLICATIONS

"Non-final Office Action Issued in U.S Appl. No. 14/956,118", dated Dec. 19, 2016, 13 Pages.

(Continued)

*Primary Examiner* — Lynn D Feild
*Assistant Examiner* — Abdullah Almamun
(74) *Attorney, Agent, or Firm* — Ray Quinney & Nebeker P.C.; Paul N. Taylor

(57) ABSTRACT

An apparatus for locking an electronic device includes an actuator, a return mechanism, and an arm. The actuator includes an actuator SMM wire that is configured to apply a contraction force. The return mechanism includes a return SMM wire that is configured to apply a return force opposite the contraction force. The arm is movable toward an unlocked position by the actuator and movable toward a locked position by the return force. The arm has at least one equilibrium position with less than 1 Newton of force on the arm from the actuator and less than 1 Newton of force on the arm from the return mechanism.

20 Claims, 10 Drawing Sheets

(51) Int. Cl.
*E05B 51/00* (2006.01)
*G06F 1/16* (2006.01)
*H04M 1/02* (2006.01)

(52) U.S. Cl.
CPC ....... *G06F 1/1679* (2013.01); *H01R 13/6397* (2013.01); *H04M 1/0249* (2013.01); *H04M 1/0254* (2013.01)

(56) References Cited

U.S. PATENT DOCUMENTS

| | | | |
|---|---|---|---|
| 5,510,957 | A | 4/1996 | Takagi |
| 6,459,855 | B1 | 10/2002 | Kosaka et al. |
| 6,530,784 | B1 | 3/2003 | Yim et al. |
| 6,583,985 | B2 | 6/2003 | Nguyen et al. |
| 6,771,494 | B2 | 8/2004 | Shimano |
| 6,781,819 | B2 | 8/2004 | Yang et al. |
| 6,845,005 | B2 | 1/2005 | Shimano et al. |
| 6,851,260 | B2 | 2/2005 | Mernøe |
| 6,944,012 | B2 | 9/2005 | Doczy et al. |
| 7,814,810 | B2 | 10/2010 | Mitteer |
| 7,992,795 | B2 | 8/2011 | Minor et al. |
| 8,827,331 | B2 | 9/2014 | Corcoran et al. |
| 8,947,861 | B2 | 2/2015 | Staats et al. |
| 9,069,527 | B2 | 6/2015 | Leong et al. |
| 9,740,245 | B2 | 8/2017 | Gault et al. |
| 2005/0046374 | A1 | 3/2005 | Ogawa et al. |
| 2008/0127684 | A1 | 6/2008 | Rudduck et al. |
| 2008/0157631 | A1* | 7/2008 | Heim .............. F04B 19/006 310/330 |
| 2011/0154817 | A1 | 6/2011 | Zimmer et al. |
| 2012/0308294 | A1 | 12/2012 | Corcoran et al. |
| 2013/0011806 | A1 | 1/2013 | Gao et al. |
| 2013/0021738 | A1 | 1/2013 | Yang et al. |
| 2014/0130316 | A1 | 5/2014 | Rudduck et al. |
| 2014/0347802 | A1 | 11/2014 | Lee |
| 2014/0362509 | A1 | 12/2014 | Lin |
| 2015/0055289 | A1 | 2/2015 | Chang et al. |
| 2015/0116926 | A1 | 4/2015 | Robinson et al. |
| 2016/0004279 | A1 | 1/2016 | Delpier et al. |
| 2016/0062411 | A1 | 3/2016 | Morrison et al. |
| 2017/0097663 | A1 | 4/2017 | Gault et al. |
| 2017/0315592 | A1 | 11/2017 | Gault et al. |

OTHER PUBLICATIONS

"International Search Report and Written Opinion Issued in PCT Application No. PCT/US2016/053858", dated Dec. 9, 2016, 12 Pages.

"International Search Report & Written Opinion Issued in PCT Application No. PCT/US2018/034516", dated Aug. 22, 2018, 13 Pages.

Hollister, Sean, "Lenovo ThinkPad Helix Tablet/laptop Hybrid Gets a Power-Up When it Docks", Retrieved From: http://www.theverge.com/2013/1/6/3844010/lenovo-thinkpad-helix-convertible, Jan. 6, 2013, 3 Pages.

"International Preliminary Report on Patentability Issued in PCT Application No. PCT/US2016/053858", dated Aug. 8, 2017, 7 Pages.

Bundhoo, et al., "A shape memory alloy-based tendon-driven actuation system for biomimetic artificial fingers, part I: design and evaluation", In Publication of Cambridge University Press, Mar. 18, 2008, pp. 1-16.

* cited by examiner

METHOD OF OPTIMIZING MEMORY WIRE ACTUATOR ENERGY OUTPUT

CROSS-REFERENCE TO RELATED APPLICATIONS

N/A

BACKGROUND OF THE DISCLOSURE

Use of computing devices is becoming more ubiquitous by the day. Computing devices range from standard desktop computers to wearable computing technology and beyond. One area of computing devices that has grown in recent years is the hybrid computers. Hybrid computers may act as a tablet computer or a laptop computer. Many hybrid computers include input devices that may be separated from the screen.

Conventional hybrid computers may connect the screen to the input devices and/or other computing components with a variety of connection mechanisms. Stronger connection mechanisms consume a greater amount of energy, decreasing battery life and/or increasing the operating temperature of the hybrid computer. A robust connection mechanism with small dimensions and lower energy consumption enables a smaller, lighter form factor of the hybrid computer.

SUMMARY

In some implementations, an apparatus for locking a computing device includes an actuator, a locking protrusion, a locking receptacle, an actuator shape memory material (SMM) wire and a return mechanism. The locking protrusion is connected to a first portion of the computing device and the locking receptacle is connected to a second portion of the computing device. The actuator SMM wire has a first state and a second state and is movable between the first state and the second state by the actuator. The first state has a first length and the second state has a second length that is shorter than the first length. Moving the actuator SMM wire from the first state to the second state applies a contraction force along a longitudinal direction of the actuator SMM wire. The return mechanism includes a return SMM wire has a first state and a second state and is movable between the first state and the second state by the actuator. The first state has a first length and the second state has a second length that is shorter than the first length. Moving the return SMM wire from the first state to the second state applies a return force along a longitudinal direction of the return SMM wire.

In other implementations, an apparatus for locking an electronic device includes an actuator, a return mechanism, and an arm. The actuator includes an actuator SMM wire that is configured to apply a contraction force. The return mechanism includes a return SMM wire that is configured to apply a return force opposite the contraction force. The arm is movable toward an unlocked position by the actuator and movable toward a locked position by the return force. The arm has at least one equilibrium position with less than 1 Newton of force on the arm from the actuator and less than 1 Newton of force on the arm from the return mechanism.

In yet other implementations, a method of selectively securing an electronic device includes changing a state of an actuator SMM wire of a locking apparatus from a first state to a second state to apply a contraction force to move the locking apparatus toward an unlocked position, and changing a state of a return SMM wire from a first state to a second state to apply a return force in a direction opposite the contraction force to move the locking apparatus toward a locked position.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of implementations of the disclosure will be set forth in the description which follows, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims, or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to devices, systems, and methods for conditioning the force applied by a locking apparatus. More particularly, the present disclosure relates to devices, systems, and methods for increasing available force in a locking apparatus during transition of the locking apparatus from a locked position to an unlocked position.

In some implementations, the locking apparatus may utilize a shape memory material (SMM) wire that has a first state and a second state. Transitioning the SMM wire from the first state to the second state may contract the SMM wire and apply a longitudinal force along the length of the SMM wire. A return mechanism may apply and/or transmit an opposing return force that opposes the contraction force and may elongate the SMM wire, restoring the SMM wire to the first state. The longitudinal displacement of at least a portion of the SMM wire may move the locking apparatus between the locked position and the unlocked position.

In conventional locking apparatuses, the return mechanism may oppose the contraction force of the SMM wire during displacement of the SMM wire. For example, the return mechanism may include a spring, which applies an increasing return force as the displacement increases. In other examples, the return mechanism may include one or more magnets, which apply a decreasing return force as displacement increases. In yet other examples, the return mechanism may include one or more mechanical linkages (such as sliding lever arms, cams, or other linkages) that alter the force curve of a spring, a magnet, or other mechanism.

In a locking apparatus according to the present disclosure, a return mechanism may include a second SMM wire that only applies a force in the locking mechanism when an energy input is provided to the second SMM wire. Movement of the locking apparatus between a locked state and an unlocked state may be related to the activation of the first SMM wire or the second SMM wire. For example, the locking apparatus may therefore remain in one or more equilibrium positions without the consumption of energy.

Figure 1:
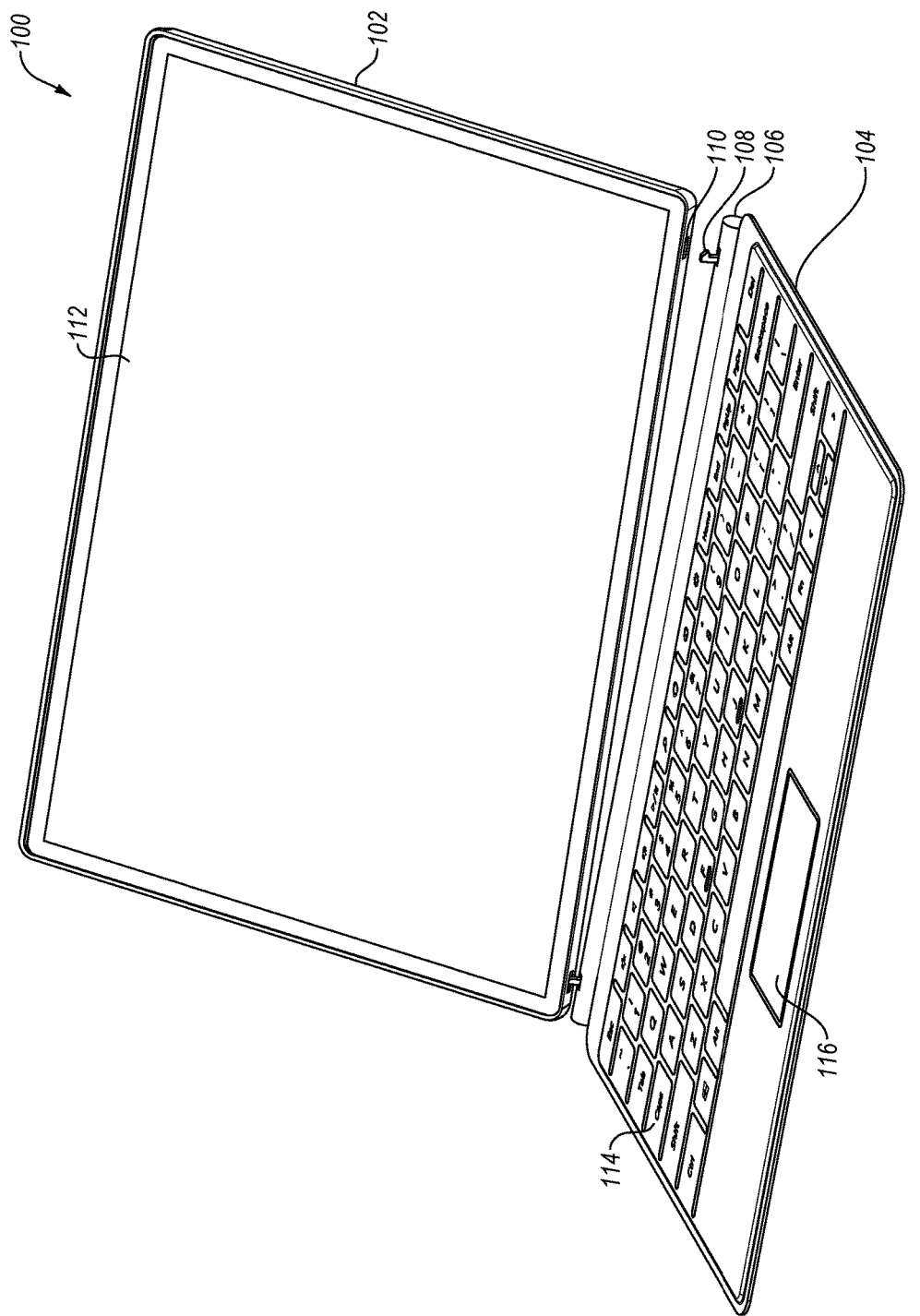
FIG. 1 is a perspective view of an implementation of a hybrid computing device, according to at least one implementation of the present disclosure.

FIG. 1 is a perspective view of an implementation of a hybrid computing device 100. In some implementations, the hybrid computing device 100 may include a first portion 102 and a second portion 104. For example, the first portion 102 may be connected to the second portion 104 by a hinge 106. In other examples, the first portion 102 may be connected to the second portion 104 by a flexible connector, a rotatable connector, or a plurality of hinges 106.

The first portion 102 and second portion 104 may be selectively coupled together by the engagement and/or disengagement of a locking apparatus. In some implementations, the hybrid computing device 100 may share computing resources, energy resources, or other resources between the first portion 102 and the second portion 104. Therefore, the locking apparatus may allow the first portion 102 and second portion 104 to be connected in a manner that limits and/or prevents the unintended decoupling of the first portion 102 and second portion 104. The locking apparatus may include a locking protrusion 108 and a locking receptacle 110 that are complimentary positioned on the first portion 102 and second portion 104. While FIG. 1 illustrates the locking protrusion 108 positioned on the second portion 104 and the locking receptacle 110 on the first portion 102, it should be understood that in other implementations, the locking apparatus may be reversed with the locking protrusion 108 on the first portion 102 and the locking receptacle 110 on the second portion 104.

In some implementations of a hybrid computing device 100, the first portion 102 may include a display 112, such as a touch sensitive device, an LCD device, or an OLED device, and the second portion 104 may include one or more human interface devices, such as a keyboard 114 or trackpad 116. In other implementations, each of the first portion 102 and second portion 104 may include one or more electronic and/or computing components. For example, the first portion 102 and/or second portion 104 may include one or more of power supplies, microprocessors, storage devices, input devices, communication devices, thermal management devices, light sources, audio devices, or other electronic and/or computing components. In some implementations, the locking apparatus may hold one or more contact surfaces of the first portion 102 and second portion 104 in contact with one another, providing electrical and/or data communication between the first portion 102 and second portion 104.

Figure 2:
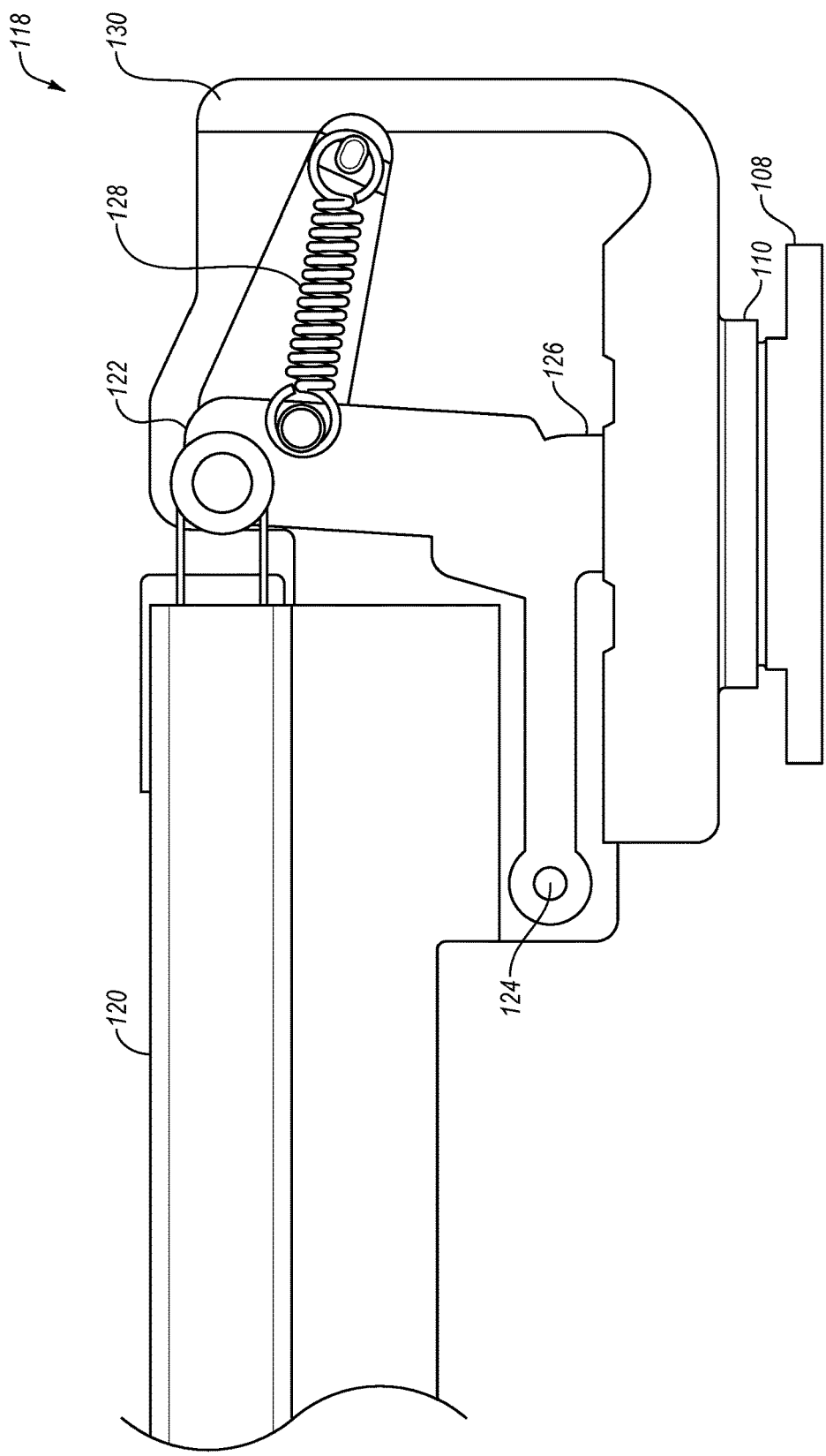
FIG. 2 is a side view of an implementation of a locking apparatus, according to at least one implementation of the present disclosure.

FIG. 2 illustrates an implementation of a locking apparatus 118 that may selectively engage a locking protrusion 108 and a locking receptacle 110. The locking apparatus 118 is shown in a locked position with the locking protrusion 108 positioned in the locking receptacle 110.

In some implementations, the locking apparatus may include an actuator 120 configured to apply a force in a longitudinal direction of the actuator 120. The actuator 120 may be connected to an arm 122 that is movable about a pivot 124. In some implementations, the pivot 124 may be a rotatable connection. In other implementations, the pivot 124 may be flexible connection and/or flexible portion of the arm 122. For example, the pivot 124 may be an elastically deformable portion of the arm 122 that allows the arm 122 to move in response to a force applied by the actuator 120.

In some implementations, the arm 122 may have a base 126 that is connected to the locking receptacle 110. Movement of the base 126 away from the locking receptacle 110 may disengage one or more features of the locking protrusion 108 to release the locking protrusion 108 relative to the locking receptacle 110. To disengage the locking protrusion 108 and the locking receptacle 110, the actuator 120 may apply a contraction force to the arm 122. Movement of the base 126 toward the locking receptacle 110 may engage one or more features of the locking protrusion 108 to retain the locking protrusion 108 relative to the locking receptacle 110. To engage the locking protrusion 108 and the locking receptacle 110, a spring 128 or other device connected to a frame 130 may apply a return force in a substantially opposite direction to the actuator 120.

In some implementations, the frame 130 may be part of the first portion and/or second portion of the hybrid computing device (i.e., integrally formed with a casing of the hybrid computing device). In other implementations, the frame 130 may be a separate component. For example, the frame 130 may connect to and/or support the actuator 120, the arm 122, the spring 128, one or more parts of the locking receptacle 110, or combinations thereof. In at least one example, the frame 130 supports all of the components of the locking apparatus 118.

Figure 3:
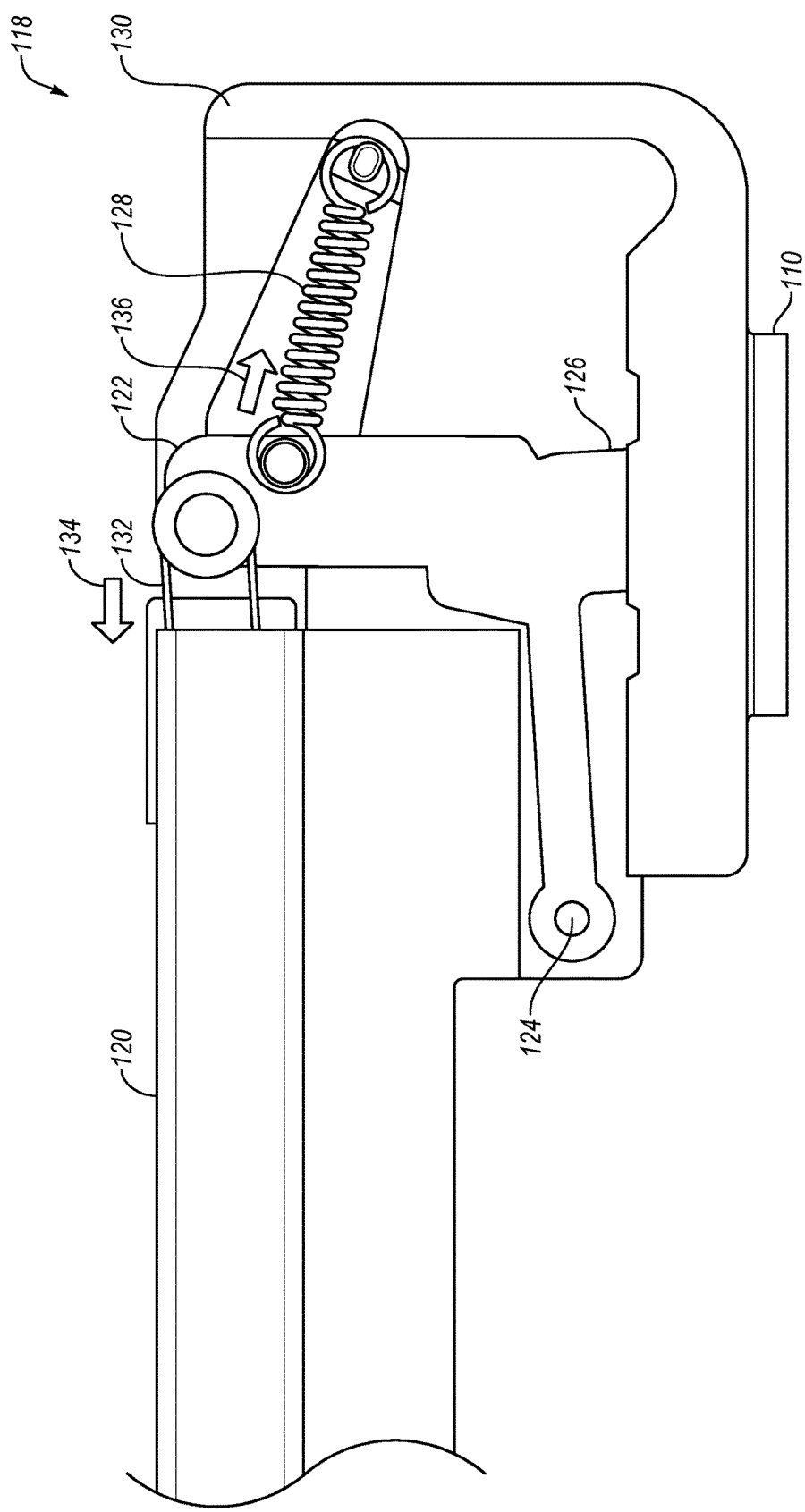
FIG. 3 is a side view of the implementation of a locking apparatus of FIG. 2 in an unlocked position, according to at least one implementation of the present disclosure.

FIG. 3 illustrates the implementation of a locking apparatus 118 of FIG. 2 in an unlocked position. In the unlocked position, the actuator 120 may be actuated to move an actuator SMM wire 132 from a first state to a second state. In some implementations, the actuator SMM wire 132 may include a SMM such as a shape memory alloy (SMA) or a shape memory polymer (SMP) that may reversibly change shape or dimension based on an energy input or external condition. For example, the SMM may transition between a first state and a second state in response to an electrical stimulus, such as a voltage or a current, applied to the actuator SMM wire 132. In other examples, the SMM may transition between a first state and a second state in response to a temperature change of the actuator SMM wire 132. In yet other examples, the SMM may transition between a first state and a second state in response to an applied mechanical force.

In some implementations, an electrical current may be applied to the actuator SMM wire 132 to increase the temperature of the actuator SMM wire 132, thereby inducing a phase transition from the first state to the second state. For example, an electric current in an actuator SMM wire 132 containing nickel titanium (e.g., Nitinol) may increase the temperature of the actuator SMM wire 132 above a transition temperature, causing the nickel titanium to transition from a martensite microstructural phase to an austenite microstructural phase. The microstructural phase transition results in an associated macrostructural shape change, shortening the actuator SMM wire 132 and applying a contraction force 134 in a longitudinal direction of the actuator SMM wire 132 and actuator 120.

The actuator SMM wire 132 may be restored to the first state (e.g., the martensite microstructural phase) by mechanical force to elongate the actuator SMM wire 132. Nickel titanium alloys undergo a phase change at approximately 100 MPa of pressure. The nominal force required to restore a 0.31 millimeter (mm) diameter actuator SMM wire 132, for example, is approximately 15 Newtons (N). Increasing the cross-sectional area of the actuator SMM wire 132 increases the return force required, and decreasing the cross-sectional area of the actuator SMM wire 132 decreases the return force required.

In some implementations, a spring 128 may apply the return force 136 to the actuator SMM wire 132 to move the actuator SMM wire 132 to the first state (e.g., the martensite microstructural phase) while elongating the actuator SMM wire 132. Elongating the actuator SMM wire 132 and restoring the actuator SMM wire 132 to the first state may return the arm 122 and base 126 to the locked position illustrated in FIG. 2.

The spring 128 may apply a return force 136 continuously and opposing the contraction force 134. Therefore, the spring 128 may reduce and/or limit the available force of the actuator 120 to move the arm 122. Further, the spring 128 may have a spring rate that increases the return force 136 as the spring 128 elongates, further reducing the available force of the actuator 120 as the actuator SMM wire 132 contracts.

Figure 4:
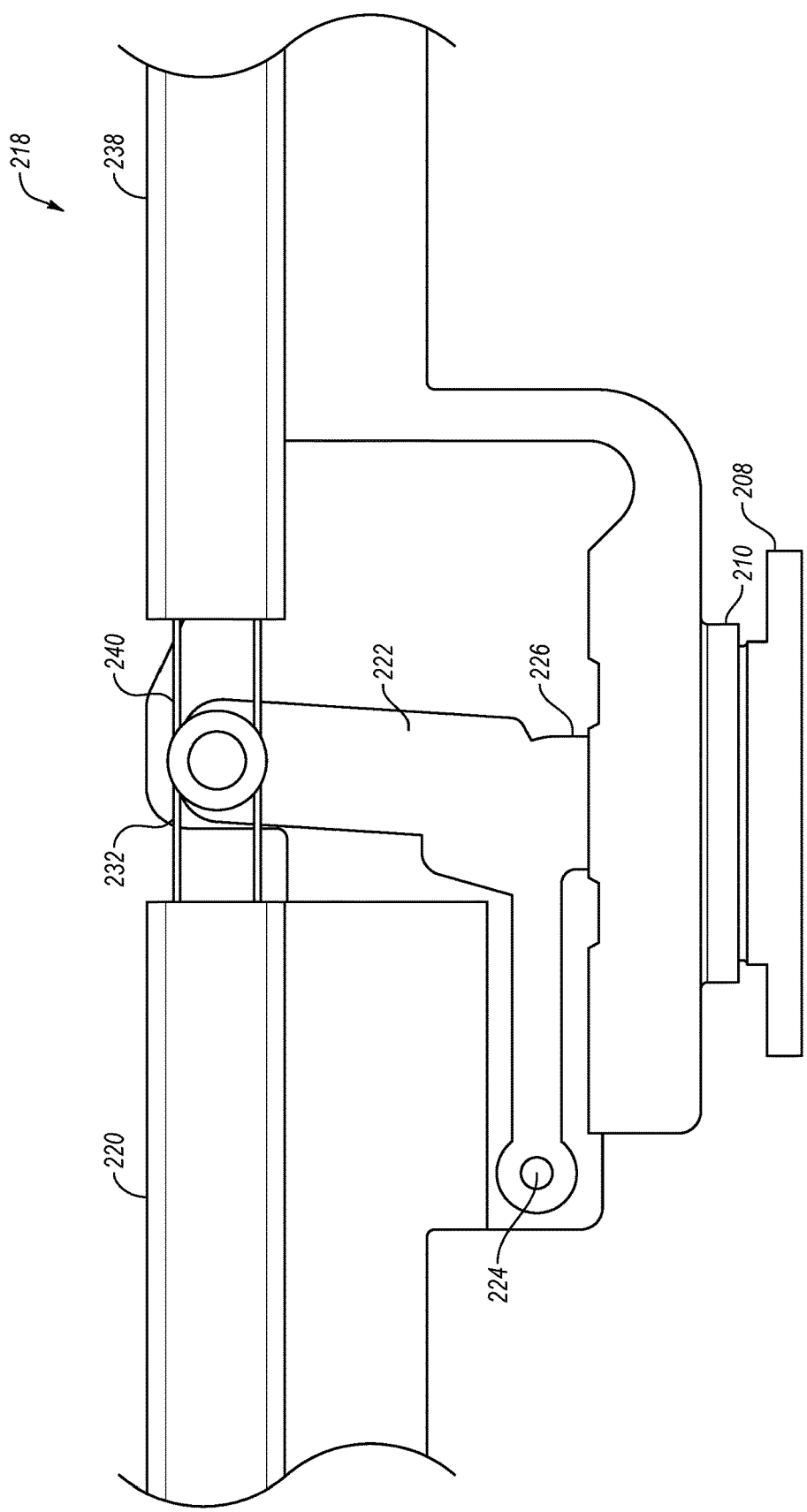
FIG. 4 is a side view of another implementation of a locking apparatus, according to at least one implementation of the present disclosure.

FIG. 4 illustrates another implementation of a locking apparatus 218 with an actuatable return mechanism 238, according to the present disclosure. The return mechanism 238 may be positioned opposite an actuator 220 and connected to an arm 222. In some implementations, a return mechanism 238 may have a return SMM wire 240. The return SMM wire 240 may have a first state and a second state, similar to the actuator SMM wire 232 of the actuator 220.

In some implementations, the arm 222 may have a base 226 that is configured to move the locking protrusion 208 and/or locking receptacle 210 of the locking apparatus 218 between a locked state and an unlocked state. In some implementations, a movement about the pivot 224 may allow the arm 222 to have a range of motion between 1° and 15°. In other implementations, the movement about the pivot 224 may allow the arm 222 to have a range of motion between 2° and 10°. In yet other implementations, the movement about the pivot 224 may allow the arm 222 to have a range of motion of about 6°.

Figure 5:
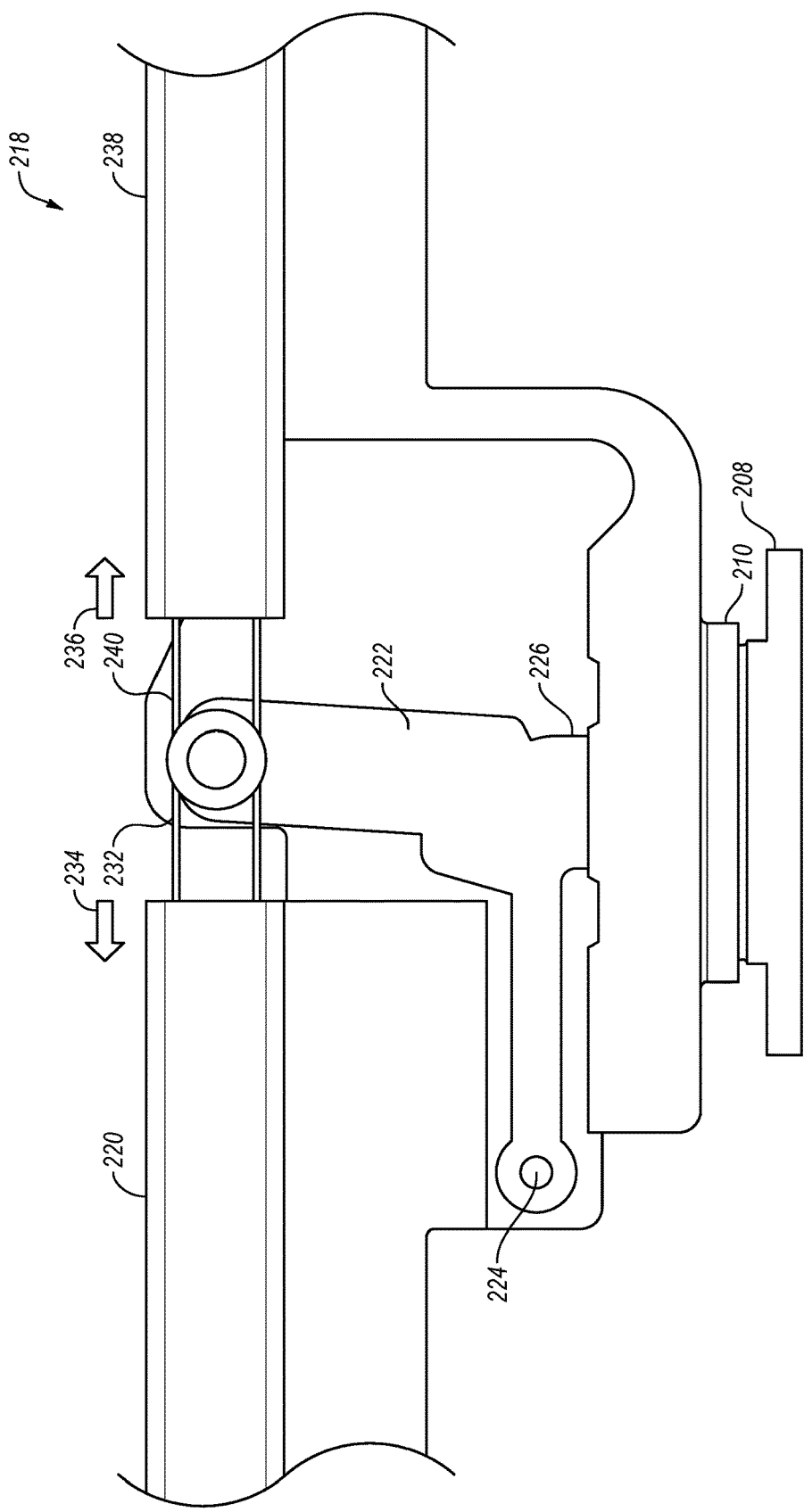
FIG. 5 is a side view of the implementation of a locking apparatus of FIG. 4 showing a contraction force and a return force, according to at least one implementation of the present disclosure.

FIG. 5 illustrates the actuator 220 applying a contraction force 234 and the return mechanism 238 applying a return force 236. The return SMM wire 240 may be oriented 180° from the actuator 220 to move the arm 222 in an opposite direction to the actuator 220. In other implementations, the return SMM wire 240 may be oriented at another angle relative to the actuator 220, such that at least a portion of a force applied by the return mechanism directly opposing (i.e., oriented at 180°) the contraction force 234. For example, the return SMM wire 240 may be oriented at an angle to the contraction force 234 in a range having an upper value, a lower value, or upper and lower values including any of 1°, 2°, 5°, 10°, 15°, 20°, 25°, 30°, 45°, or any values therebetween. For example, the return SMM wire 240 may be oriented at an angle to the contraction force 234 greater than 1°. In other examples, the return SMM wire 240 may be oriented at an angle to the contraction force 234 less than 45°. In yet other examples, the return SMM wire 240 may be oriented at an angle to the contraction force 234 between 1° and 45°. The return force 236 may be the portion of the force provided by the return mechanism 238 opposing the contraction force 234 and/or the actuator SMM wire 232.

Figure 6:
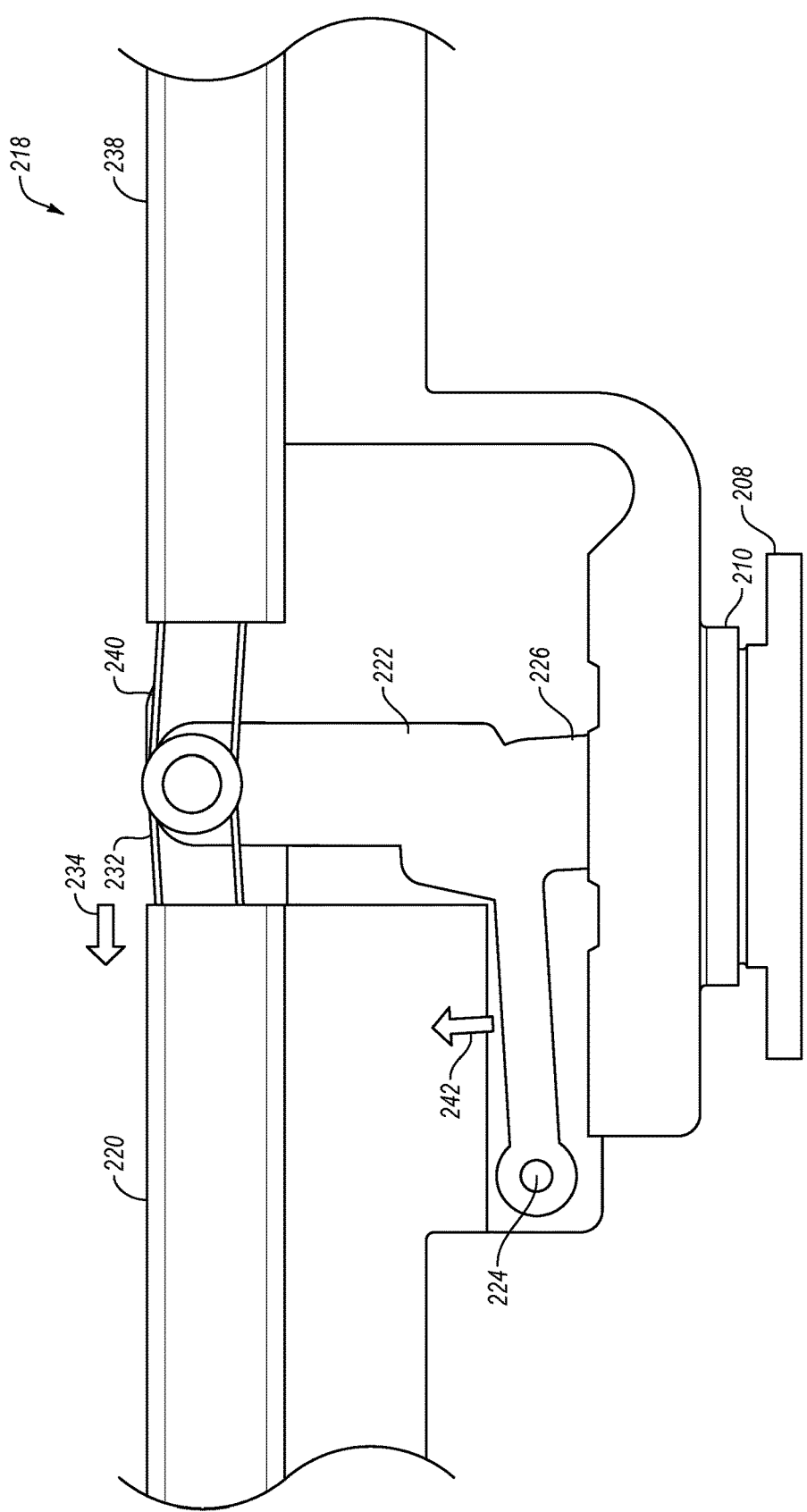
FIG. 6 is a side view of the implementation of a locking apparatus of FIG. 4 showing a contraction force moving an arm toward an unlocked position, according to at least one implementation of the present disclosure.

FIG. 6 illustrates the movement of the arm 222 toward the actuator 220 and in a first rotational direction 242. The actuator SMM wire 232 may move from a first state to a second state, resulting in a reduction in length from a first length to a second length. The actuator SMM wire 232 may apply a contraction force 234 to the arm 222, moving the base 226. The movement of the base 226 may move the locking apparatus 218 (and locking protrusion 208 and locking receptacle 210) from a locked position to an unlocked position. While the arm 222 is shown moving about the pivot 224 in an arcuate path, it should be understood that in other implementations, the arm 222 may translate linear a distance in response to the contraction force 234.

The movement of the actuator SMM wire 232 from the first state to the second state may shorten the actuator SMM wire 232 and elongate the return SMM wire 240. In some implementations, the return SMM wire 240 may be in a first state. In other implementations, elongating the return SMM wire 240 may move the return SMM wire 240 from a second state to an elongated first state. In at least one implementation, the return SMM wire 240 may be in a first state when in an elongated state.

In some implementations, the contraction of the actuator SMM wire 232 may apply at least 300 Megapascals of pressure. In other implementations, the contraction of the actuator SMM wire 232 may apply at least 325 Megapascals of pressure. In yet other implementations, the contraction of the actuator SMM wire 232 may apply at least 350 Megapascals of pressure. In some implementations, a single SMM wire may provide a connection. In the depicted implementation with an actuator SMM wire 232 and/or a return SMM wire 240 doubled back, the forces may double without significant impact on the amount of space needed for the device. Example dimensions and forces for an implementation of a locking mechanism according to the present disclosure are presented below:

|  | Actuator Wire | Return Wire |
| --- | --- | --- |
|  | (Single strand wire) | |
| Wire Dia (mm) | 0.31 | 0.17 |
| Max reliable force output (N) | 26.05 | 7.8 |
| Force needed to return (N) | 7.75 | 2.3 |
|  | (2 strands wrapped around) | |
| Wire Dia (mm) | 0.31 | 0.17 |
| Max reliable force output (N) | 52.1 | 15.6 |
| Force needed to return (N) | 15.5 | 4.6 |

In some implementations, the actuator SMM wire 232 and the return SMM wire 240 may have different cross-sectional dimensions (e.g., diameter). For example, the return SMM wire 240 may require about 4.6 N to stretch the return SMM wire 240 back into the first state. This force may reduce the available force from the actuator SMM wire 232. For example, the available maximum force of the actuator SMM wire 232 may be about 47.5 N from the nominal maximum of 52.1 N. This may allow for a greater net maximum force available as compared to a comparable conventional spring-based return mechanism.

Figure 7:
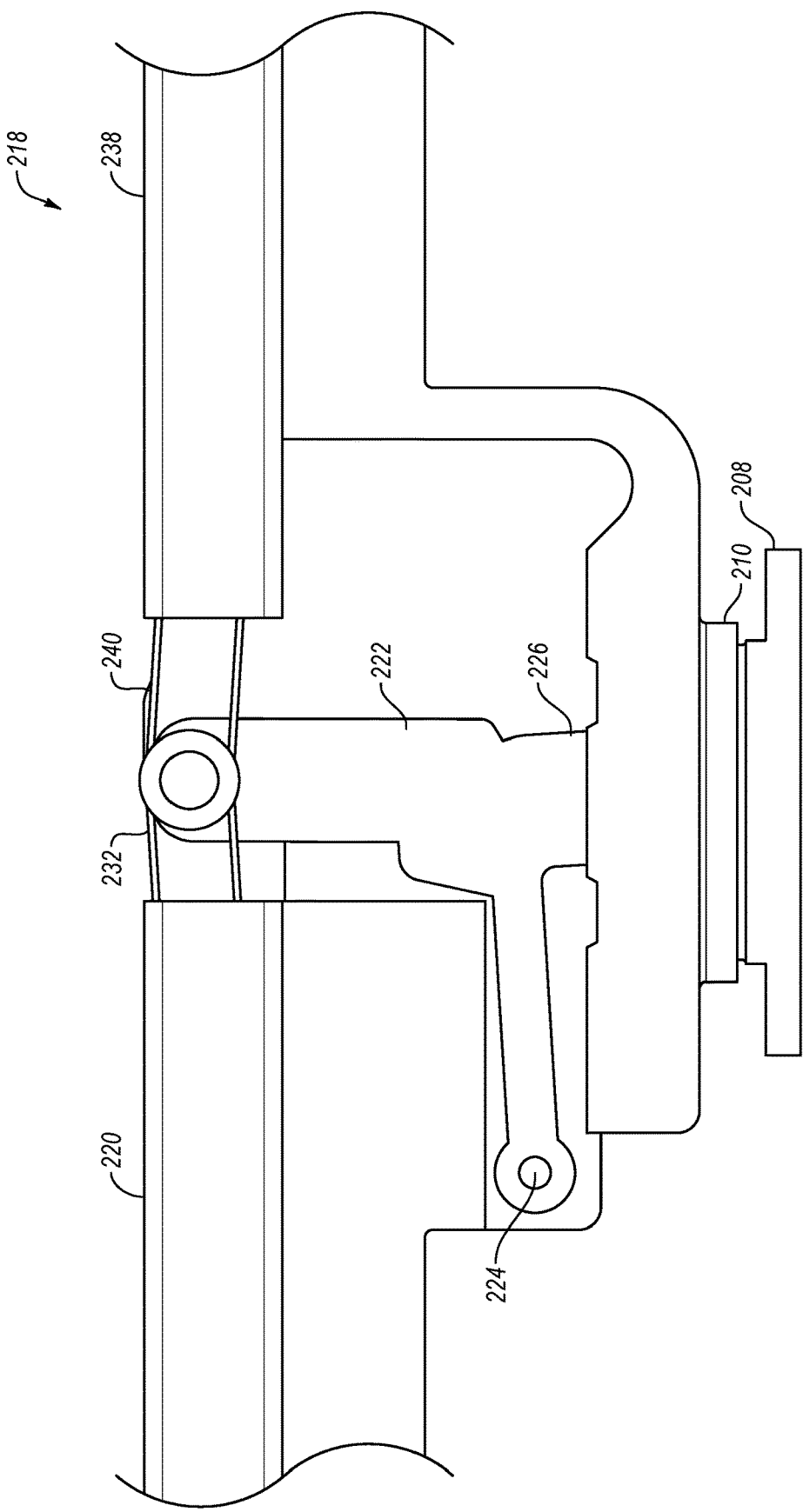
FIG. 7 is a side view of the implementation of a locking apparatus of FIG. 4 showing a first equilibrium position, according to at least one implementation of the present disclosure.

In some implementations, the electric current, temperature, or other energy input to the actuator SMM wire 232 may be terminated and the locking apparatus 218 may enter an equilibrium state. FIG. 7 illustrates the locking apparatus 218 in a first equilibrium state. When the energy input to the actuator SMM wire 232 is terminated, for example, the actuator SMM wire 232 is allowed to cool down to ambient temperature, the SMM may cease transitioning to the second state from the first state and remain in a substantially constant longitudinal length. In some implementations, at least a portion of the actuator SMM wire 232 may be in the first state and at least a portion may be in the second state. In other implementations, the actuator SMM wire 232 may be entirely in the second state. In yet other implementations, substantially all of the actuator SMM wire 232 may return to the first state upon cooling to ambient temperature.

Additionally, the return SMM wire 240 may be in an elongated state upon termination of the energy input to the actuator SMM wire 232. The return SMM wire 240 may be in the first state. The arm 222 may remain substantially stationary in the first equilibrium position shown in FIG. 7 when no energy input is applied to the actuator SMM wire 232 and the return SMM wire 240. For example, there may be no net force on the arm 222. In some implementations, the force applied, individually, by the actuator SMM wire 232 and/or the return SMM wire 240 may be a residual elastic force that is less than 1 Newton. In other implementations, the actuator SMM wire 232 may apply zero force to the arm 222 when no energy input is applied to the actuator SMM wire 232 and the return SMM wire 240 may apply zero force to the arm 222 may no energy input is applied to the return SMM wire 240. Therefore, the arm 222 may remain substantially stationary in the first equilibrium position.

Figure 8:
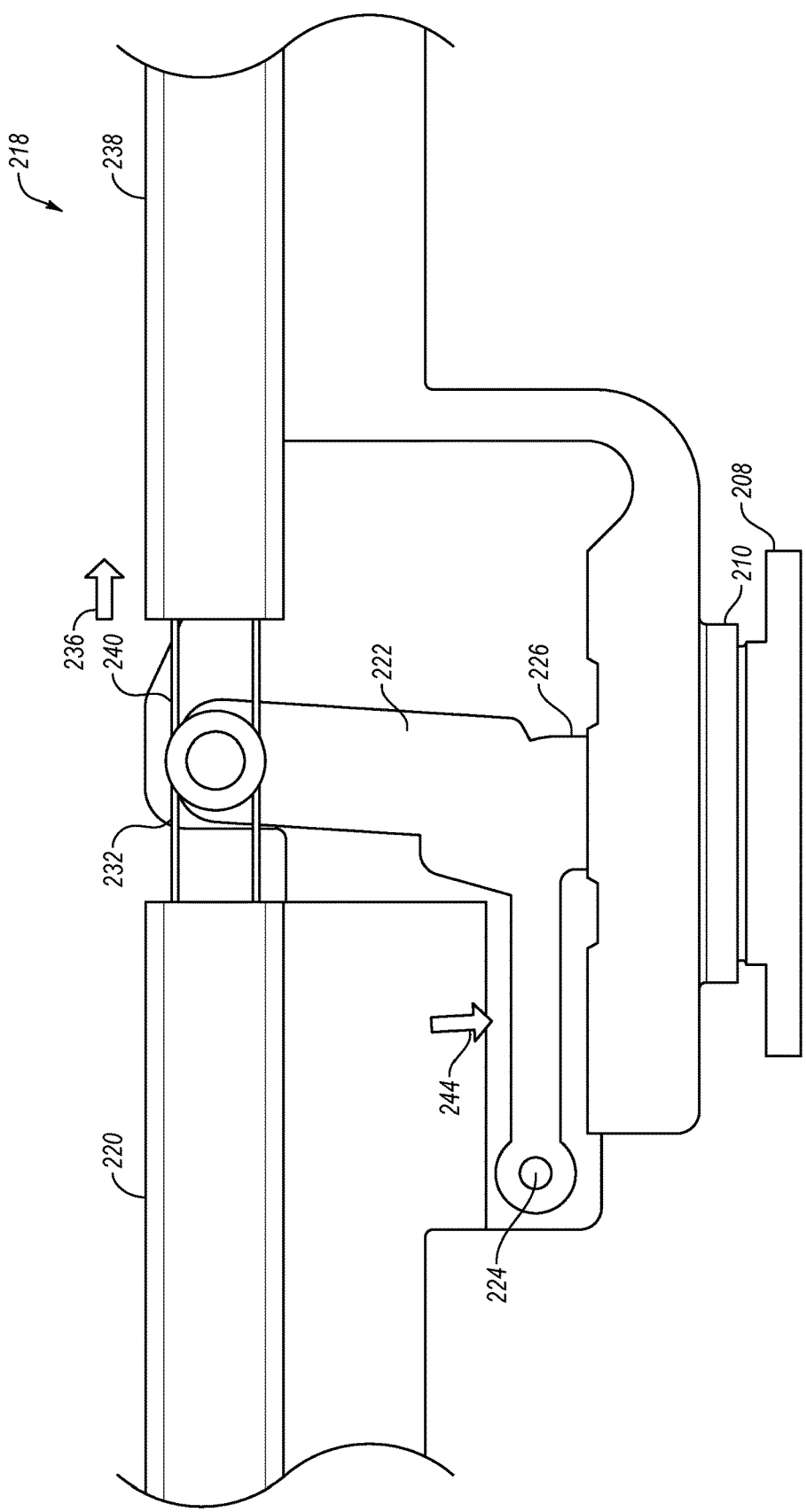
FIG. 8 is a side view of the implementation of a locking apparatus of FIG. 4 showing a return force moving an arm toward a locked position, according to at least one implementation of the present disclosure.

FIG. 8 is a side view of the return mechanism 238 moving the arm 222 toward a locked position. An energy input may be applied to the return SMM wire 240 to move the return SMM wire 240 from a first state to a second state, shortening the return SMM wire 240 and applying a return force 236 to the arm 222. In some implementations, the return force 236 may rotate the arm 222 in a second rotational direction 244 and move the arm 222 to a locked position, engaging the locking protrusion 208 and locking receptacle 210.

In some implementations, the return SMM wire 240 may provide a pressure less than the actuator SMM wire 232. For example, the return SMM wire 240 may provide a pressure greater than 100 MPa. In other examples, the return SMM wire 240 may provide a pressure about 105 MPa.

In some implementations, the return SMM wire 240 may have a diameter that is less than a diameter of the actuator SMM wire 232. For example, the return SMM wire 240 may have a diameter about 0.15 mm, and the actuator SMM wire 232 may have a diameter about 0.3 mm. In other implementations, the actuator SMM wire 232 and the return SMM wire 240 may have a diameter ratio (e.g., actuator SMM wire diameter to return SMM wire diameter) in a range having an upper value, a lower value, or an upper and lower value including any of 1.0, 1.5, 2.0, 2.5, 3.0, or any values therebetween. For example, the diameter ratio may be greater than 1.0. In other examples, the diameter ratio may be less than 3.0. In yet other examples, the diameter ratio may be between 1.0 and 3.0. In further examples, the diameter ratio may be greater than 2.0. In at least one example, the diameter ratio may be about 2.0.

In some implementations, the electric current, temperature, or other energy input to the return SMM wire 240 may be terminated and the locking apparatus 218 may enter a second equilibrium state. When the energy input to the return SMM wire 240 is terminated, for example, the return SMM wire 240 is allowed to cool down to ambient temperature, the SMM may cease transitioning to the second state from the first state and remain in a substantially constant longitudinal length. In some implementations, at least a portion of the return SMM wire 240 may be in the first state and at least a portion may be in the second state. In other implementations, the return SMM wire 240 may be entirely in the second state. In yet other implementations, substantially all of the return SMM wire 240 may return to the first state upon cooling to ambient temperature.

Additionally, the actuator SMM wire 232 may be in an elongated state upon termination of the energy input to the return SMM wire 240. In some implementations, the actuator SMM wire 232 may be in the first state. The arm 222 may remain substantially stationary in the second equilibrium position when no energy input is applied to the actuator SMM wire 232 and the return SMM wire 240. For example, there may be no net force on the arm 222. In some implementations, the force applied, individually, by the actuator SMM wire 232 and/or the return SMM wire 240 may be a residual elastic force that is less than 1 Newton. In other implementations, the actuator SMM wire 232 may apply zero force to the arm 222 when no energy input is applied to the actuator SMM wire 232 and the return SMM wire 240 may apply zero force to the arm 222 may no energy input is applied to the return SMM wire 240. Therefore, the arm 222 may remain substantially stationary in the second equilibrium position.

In some implementations, the first equilibrium position (i.e., immediately after the termination of energy input to the actuator SMM wire 232) and the second equilibrium position (i.e., immediately after the termination of energy input to the return SMM wire 240) may be different. For example, the first equilibrium position may be the unlocked position. In other examples, the second equilibrium position may be the locked position. In other implementations, the first equilibrium position and the second equilibrium position may be the same position. For example, the first equilibrium position and the second equilibrium position may both be an intermediate position with the arm 222 positioned between the locked position and the unlocked position.

Figure 9:
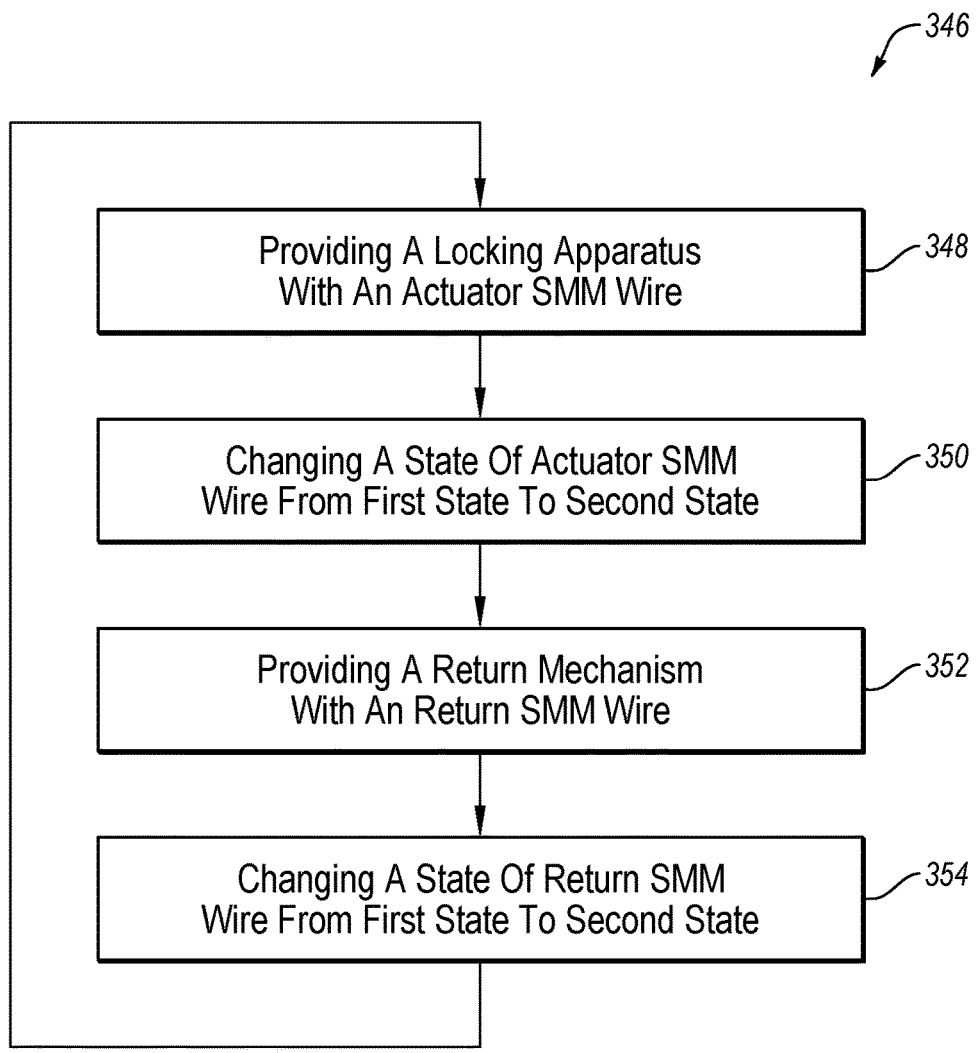
FIG. 9 is a flowchart illustrating a method of selectively locking a locking apparatus, according to at least one implementation of the present disclosure.

FIG. 9 a flowchart illustrating an implementation of a method 346 of selectively locking a locking apparatus. In some implementations, the method 346 includes providing a locking apparatus with an actuator, as described herein, at 348. The actuator may include an actuator SMM wire that applies a contraction force to move an arm, and the return mechanism may apply a return force that acts on the arm in a direction at least partially opposing the contraction force.

The method 346 may include changing a state of the actuator SMM wire at 350. In some implementations, changing the state may include changing the macrostructure of the actuator SMM wire. In other implementations, changing the state of the actuator SMM wire may include changing the microstructural state of the actuator SMM wire. For example, changing the state of the actuator SMM wire may include changing the microstructure of the actuator SMM wire from a martensite microstructural phase to an austenite microstructural phase. In at least one example, the actuator SMM wire may be a nickel titanium compound, and changing the state of the actuator SMM wire may include changing the temperature of the actuator SMM wire beyond a transition temperature. In other examples, changing the state of the actuator SMM wire may include applying an electrical current to the actuator SMM wire. In yet other examples, changing the state of the actuator SMM wire may include applying an electrical potential across the actuator SMM wire.

Upon changing the state of the actuator SMM wire, the actuator SMM wire may apply a contraction force in the locking apparatus to move an arm toward an unlocked position. After moving the arm of the locking apparatus to an unlocked position, the method 346 may further include applying a return force in an opposite direction to the contraction force. To provide the return force, the method 346 may include providing a return mechanism with a return SMM wire at 352. The return mechanism may include a return SMM wire that applies a return force to move the arm in a direction opposite that of the actuator SMM wire.

The method 346 may include changing a state of the return SMM wire at 354. In some implementations, changing the state may include changing the macrostructure of the return SMM wire. In other implementations, changing the state of the return SMM wire may include changing the microstructural state of the return SMM wire. For example, changing the state of the return SMM wire may include changing the microstructure of the return SMM wire from a martensite microstructural phase to an austenite microstructural phase. In at least one example, the return SMM wire may be a nickel titanium compound, and changing the state of the return SMM wire may include changing the temperature of the return SMM wire beyond a transition temperature. In other examples, changing the state of the return SMM wire may include applying an electrical current to the return SMM wire. In yet other examples, changing the state of the return SMM wire may include applying an electrical potential across the return SMM wire.

In some implementations, the return force may act directly upon the arm. In other implementations, the return force may act upon a mechanical linkage that transmits at least a portion of the return force to oppose the contraction force. For example, the mechanical linkage may be a pully or lever that changes a direction of a force from the return mechanism to oppose the contraction force. In other examples, a mechanical linkage may include a camming device or sliding-bar linkage to transmit the return force non-linearly to the arm.

In other implementations, the contraction force and/or return provided to the arm may provide a substantially flat force curve of available force. For example, a substantially flat force curve may be a force curve that is entirely within a 10% variation between the locked position and the unlocked position of the maximum value of the force curve. In other examples, a substantially flat force curve may be a force curve that is entirely within a 5% variation between the locked position and the unlocked position of the maximum value of the force curve.

In some implementations, changing the return SMM wire from the first state to the second state at 354 and applying a return force to the arm may mechanically elongate the actuator SMM wire. In other implementations, changing the return SMM wire from the first state to the second state and applying a return force to the arm may mechanically elongate the actuator SMM wire and move the actuator SMM wire to the first state. Similarly, changing the actuator SMM wire from the first state to the second state at 350 and applying a contraction force to the arm may mechanically elongate the return SMM wire. In other implementations, changing the actuator SMM wire from the first state to the second state and applying a contraction force to the arm may mechanically elongate the return SMM wire and move the return SMM wire to the first state from the second state. Because each alternating activation of the actuator SMM wire and return SMM wire, respectively, may restore the other wire to an original state, the method 346 may repeat and cycle the wires and arm.

Figure 10:
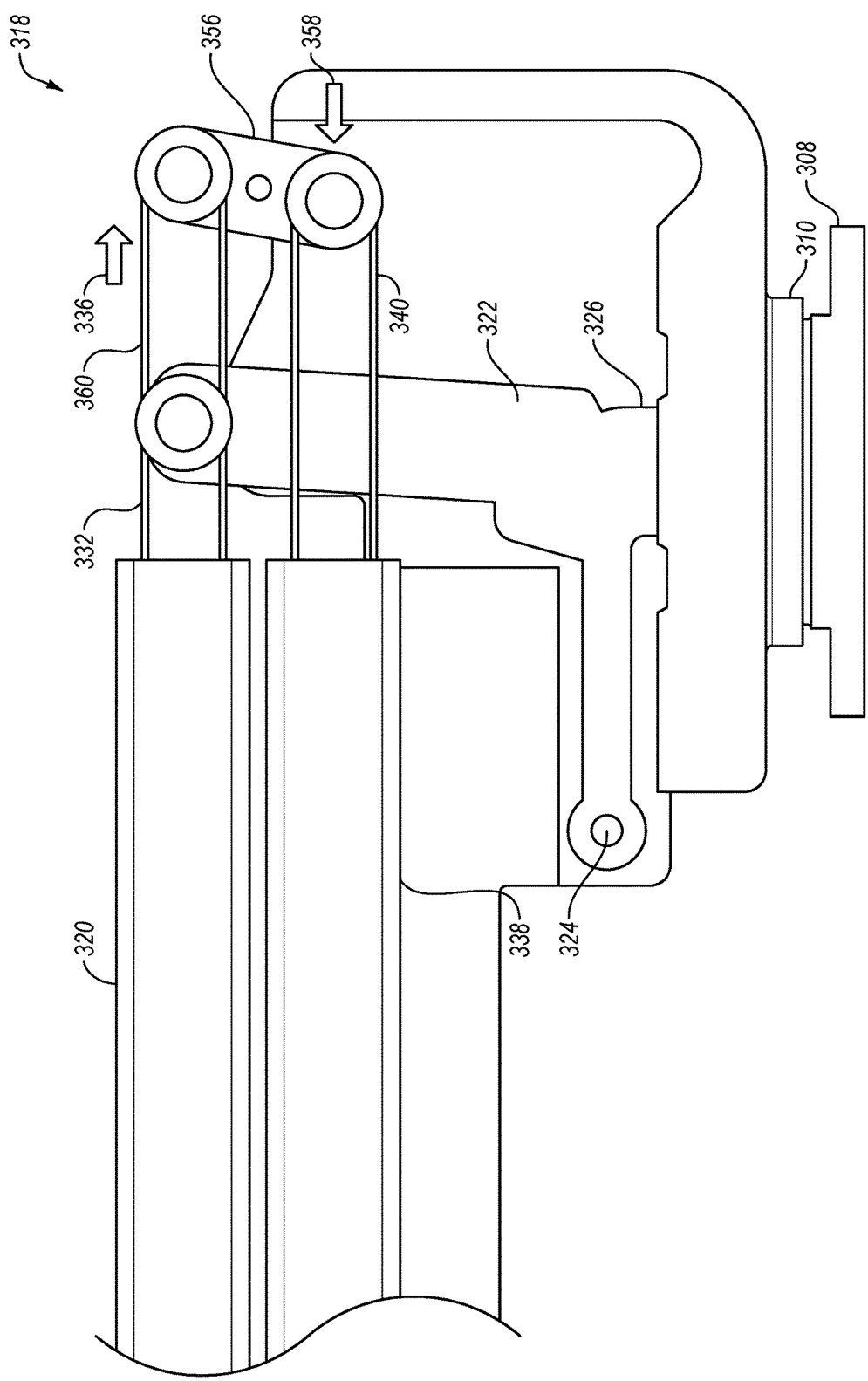
FIG. 10 is a side view of an implementation of a locking apparatus with a return mechanism including a mechanical linkage, according to at least one implementation of the present disclosure.

FIG. 10 illustrates another implementation of a locking apparatus 318 with a return SMM wire 340 configured to apply a force to a mechanical linkage. As described in relation to the method illustrated in FIG. 9, a return mechanism 338 may include one or more mechanical linkages to alter the direction of a wire force 358 from the return SMM wire 340 to the arm 322 to apply a return force 336.

In some implementations, the mechanical linkage may be a lever 356. For example, the return SMM wire 340 may be positioned at an orientation not directly opposing the actuator SMM wire 332. In at least one example, the return mechanism 338 and the actuator 320 may be substantially parallel to one another, with the return SMM wire 340 and the actuator SMM wire 332 substantially parallel. The lever 356 may receive a wire force 358 from the return SMM wire 340 at a first end of the wire and apply a return force 336 via a return wire 360 or similar structure connected to the arm 322 at a second end of the lever 356.

In other implementations, the mechanical linkage may be a pulley. For example, the return SMM wire 340 may loop around a pulley and connect to the arm 322. In such an example, the shortening of the return SMM wire when moving from a first state to a second state may apply a return force 336 in a direction other than toward the return mechanism 338. In yet other implementations, the mechanical linkage may be a sliding bar linkage or cam that provides non-linear translation of a wire force to the arm. For example, the return force 336 may change during the movement between the unlocked state and the locked state.

In at least one implementation, a return mechanism using a SMM wire may allow for greater efficiency. For example, a locking apparatus according the present disclosure may allow for increased available unlocking force over conventional locking apparatuses. In at least another implementation, a return mechanism using a SMM wire may allow for greater flexibility in packaging the locking mechanism. For example, a locking apparatus according to the present disclosure may have a smaller dimensional footprint than a conventional locking apparatus. In other implementations, the locking apparatus may have a substantially flat available force curve that provides efficient movement of the locking apparatus from the locked position to the unlocked position and back. In at least one implementation, a locking apparatus according to the present disclosure may have at least one equilibrium position in which an arm of the locking apparatus experiences less than 1 Newton of force applied by either an actuator or a return mechanism.

One or more specific implementations of the present disclosure are described herein. These described implementations are examples of the presently disclosed techniques. Additionally, in an effort to provide a concise description of these implementations, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An apparatus for locking a computing device, comprising:
   an actuator;
   a locking protrusion connected to a first portion of the computing device;
   a locking receptacle connected to a second portion of the computing device;
   an actuator SMM wire having a first state and a second state and movable between the first state and the second state by the actuator, the first state having a first length and the second state having a second length that is shorter than the first length, wherein moving the actuator SMM wire from the first state to the second state applies a contraction force along a longitudinal direction of the actuator SMM wire; and
   a return mechanism having a return SMM wire with a first state and a second state and movable between the first state and the second state by the return mechanism, the first state having a first length and the second state having a second length that is shorter than the first length, wherein moving the return SMM wire from the first state to the second state applies a return force along a longitudinal direction of the return SMM wire, the return force applied by the return SMM wire pulling the actuator SMM wire toward its first length.

2. The apparatus of claim 1, the return SMM wire including nickel titanium.

3. The apparatus of claim 1, the first state of the return SMM wire being a martensite microstructural phase and the second state being an austenite microstructural phase.

4. The apparatus of claim 1, the actuator SMM wire including nickel titanium.

5. The apparatus of claim 1, the first state of the actuator SMM wire being a martensite microstructural phase and the second state being an austenite microstructural phase.

6. The apparatus of claim 1, the return mechanism applying a return force only when an electric current is applied to the return SMM wire.

7. The apparatus of claim 1, an available force curve of the SMM wire being within a 10% variation of the maximum available force between the first state and the second state.

8. The apparatus of claim 1, the return force being oriented 180° from the contraction force.

9. An apparatus for locking an electronic device, comprising:
- an actuator containing an actuator SMM wire, the actuator SMM wire configured to apply a contraction force;
- a return mechanism containing a return SMM wire, the return mechanism configured to apply a return force opposite the contraction force, the return force applied by the return SMM wire pulling the actuator SMM wire toward an initial position; and
- an arm movable toward an unlocked position by the actuator and movable toward a locked position by the return mechanism; the arm having at least one equilibrium position with less than 1 Newton of force on the arm from the actuator and less than 1 Newton of force on the arm from the return mechanism.

10. The apparatus of claim 9, the return SMM wire being oriented 180° from the actuator SMM wire.

11. The apparatus of claim 9, the return mechanism including a mechanical linkage to convert a wire force of the return SMM wire to the return force.

12. The apparatus of claim 9, the actuator wire having a greater diameter than the return wire.

13. The apparatus of claim 9, the actuator wire and return wire having a diameter ratio at least 2.0.

14. The apparatus of claim 9, the actuator wire having a diameter of about 0.3 mm.

15. The apparatus of claim 9, the actuator configured to apply at least 300MPa to move the arm toward the unlocked position and the return mechanism configured to apply at least 100 MPa to move the arm toward the unlocked position.

16. A method of selectively securing an electronic device, the method including:
- changing a state of an actuator SMM wire of a locking apparatus from a first state to a second state to apply a contraction force to move the locking apparatus toward an unlocked position; and
- changing a state of a return SMM wire from a first state to a second state to apply a return force in a direction opposite the contraction force to move the locking apparatus toward a locked position, the return force applied by the return SMM wire pulling the actuator SMM wire toward the first state.

17. The method of claim 16, wherein there is less than 1 Newton of net force on the locking apparatus in the unlocked position.

18. The method of claim 16, wherein there is less than 1 Newton of net force on the locking apparatus in the locked position.

19. The method of claim 16, further comprising restoring the actuator SMM wire to the first state from the second state by applying a mechanical force with the return SMM wire.

20. The method of claim 19, further comprising restoring the return SMM wire to the first state from the second state by applying a mechanical force with an actuator.

* * * * *